(12) United States Patent
Dutch et al.

(10) Patent No.: US 8,966,293 B1
(45) Date of Patent: Feb. 24, 2015

(54) METHOD AND APPARATUS FOR ALLOCATION OF POWER CONSUMPTION OF A COMPUTER STORAGE SYSTEM TO ITS TENANTS

(75) Inventors: Michael John Dutch, Saratoga, CA (US); Robert B. Masson, Hingham, MA (US)

(73) Assignee: EMC Corporation, Hopkinton, MA (US)

( * ) Notice: Subject to any disclaimer, the term of this patent is extended or adjusted under 35 U.S.C. 154(b) by 552 days.

(21) Appl. No.: 13/336,410

(22) Filed: Dec. 23, 2011

(51) Int. Cl.
*G06F 1/00* (2006.01)
*G06F 1/26* (2006.01)
*G06F 1/32* (2006.01)

(52) U.S. Cl.
USPC .......... 713/300; 713/310; 713/320; 713/322; 713/323

(58) Field of Classification Search
USPC .......................... 713/300, 310, 320, 322, 323
See application file for complete search history.

(56) References Cited

U.S. PATENT DOCUMENTS

| 8,230,238 | B2* | 7/2012 | Allalouf et al. | 713/300 |
| 8,332,673 | B2* | 12/2012 | Taguchi et al. | 713/320 |
| 2010/0174931 | A1* | 7/2010 | Clarke et al. | 713/320 |
| 2011/0208622 | A1* | 8/2011 | Gopisetty et al. | 705/30 |
| 2011/0238672 | A1* | 9/2011 | Agarwala et al. | 707/748 |

* cited by examiner

*Primary Examiner* — Zahid Choudhury
(74) *Attorney, Agent, or Firm* — Krishnendu Gupta; Gerald P. Kazanjian

(57) ABSTRACT

Example embodiments of the present invention provide a method, an apparatus, and a computer program product for determining power consumption of a computer storage system attributable to an application. The method includes obtaining metadata relating to power consumption of a computer storage system and obtaining metadata relating to storage configuration of the computer storage system. Storage utilization of the computer system attributable to an application is then determined and a transformation is performed according to the metadata relating to power consumption of the computer storage system, the metadata relating to storage configuration of the computer storage system, and the storage utilization of the computer storage system attributable to the application.

19 Claims, 6 Drawing Sheets

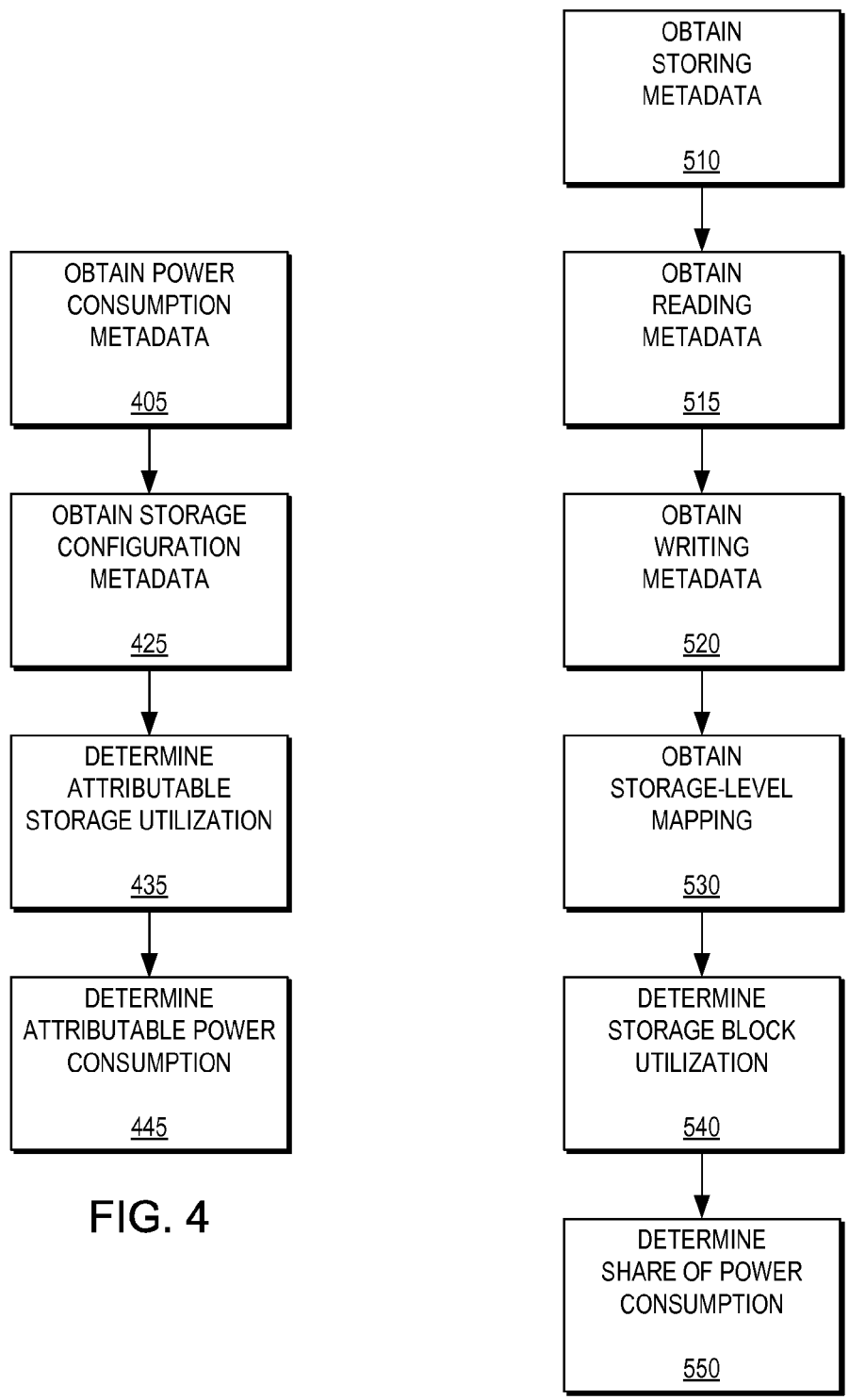

METHOD AND APPARATUS FOR ALLOCATION OF POWER CONSUMPTION OF A COMPUTER STORAGE SYSTEM TO ITS TENANTS

RELATED APPLICATION

This application is related to co-pending U.S. patent application Ser. No. 13/076,747 entitled "ENERGY-AWARE VIRTUAL INFRASTRUCTURE" filed on Mar. 31, 2011, the contents of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to monitoring energy consumption in a computer network.

BACKGROUND

Energy efficiency has recently taken on a great deal of importance in Information Technology. Two major issues have driven this switch: (1) the cost of electricity and (2) concern for the environment.

SUMMARY

Example embodiments of the present invention provide a method, an apparatus, and a computer program product for determining power consumption of a computer storage system attributable to an application. The method includes obtaining metadata relating to power consumption of a computer storage system and obtaining metadata relating to storage configuration of the computer storage system. Storage utilization of the computer system attributable to an application is then determined and a transformation is performed according to the metadata relating to power consumption of the computer storage system, the metadata relating to storage configuration of the computer storage system, and the storage utilization of the computer storage system attributable to the application.

BRIEF DESCRIPTION OF THE DRAWINGS

The above and further advantages of the present invention may be better under stood by referring to the following description taken into conjunction with the accompanying drawings in which:

FIGS. 4-5 are flow diagrams illustrating example methods for determining power consumption of a computer storage system attributable to an application according to example embodiments of the present invention;

DETAILED DESCRIPTION

Figure 1:
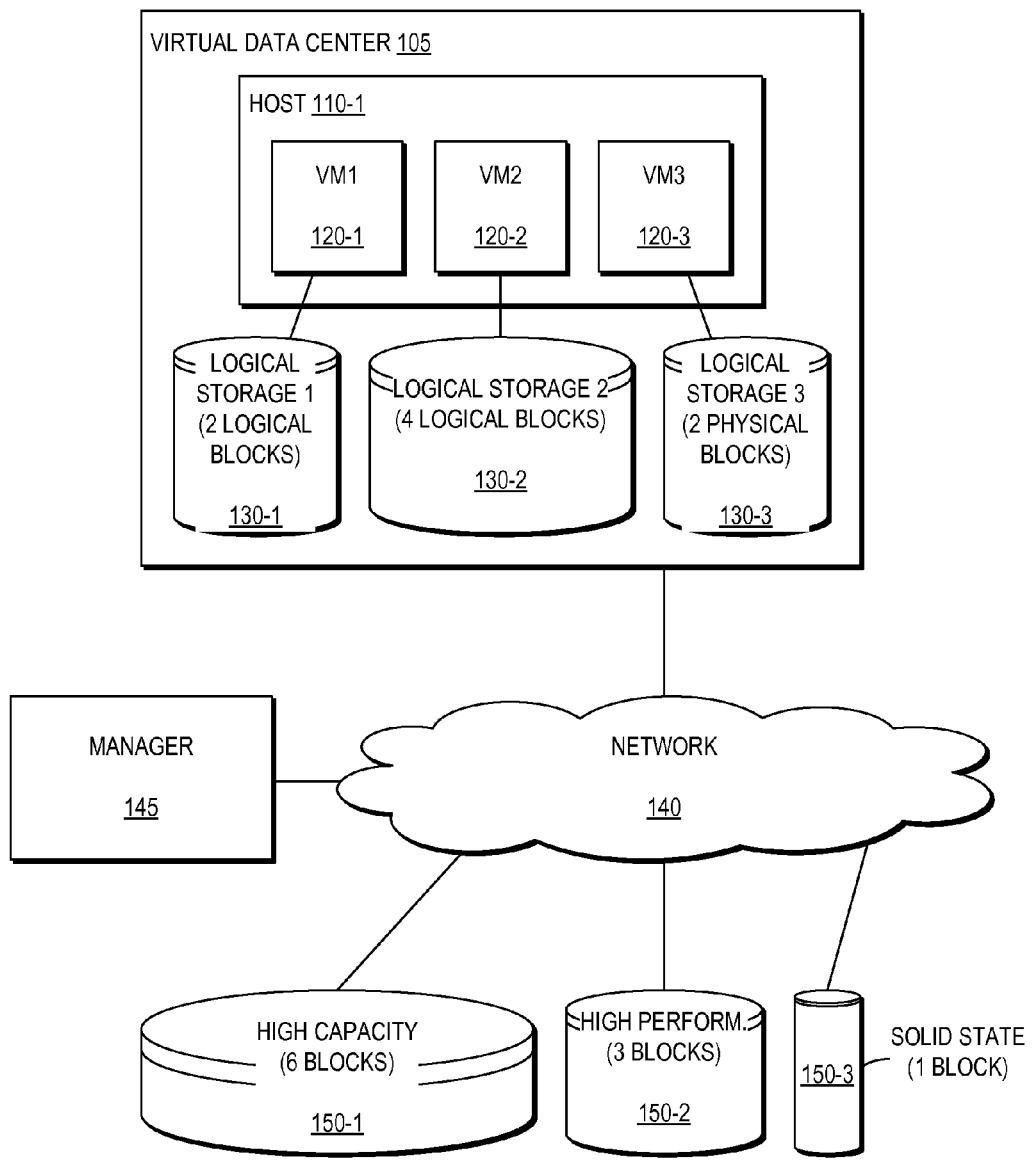
FIG. 1 is a block diagram of a virtual data center having three tenants, physical storage, and a manager for managing the virtual storage.

As organizations migrate to virtualized Information Technology (IT) infrastructures, many have found that it is no longer necessary to own, operate, and maintain a dizzying array of servers and switches to run their businesses. Instead, it is more cost-efficient to outsource operations to a service provider. The provider can gain major economies of scale by consolidating the IT operations of many organizations into a single data center.

Sharing infrastructure resources saves on equipment costs. For example, a cloud service provider runs and maintains applications and charges the owner of the application a fee. Such a multi-tenant architecture allows applications from different organizations to use the same hardware simultaneously. Similarly, fewer IT managers are required to maintain the same quality of service. In addition, this architecture results in less equipment in use and therefore less power consumed. Given these dimensions of savings, service providers must be able to allocate the costs of their physical plant, equipment, and labor and charge them back to the user. These so-called "charge-back" mechanisms measure and bill for labor and equipment. However, traditional charge-back mechanisms do not capture power utilization.

In order to make cloud computing an attractive business proposition, one generally adopts a multi-tenant model. That is, several applications potentially tied to several different owners all running on the same physical machine. Costs could be allocated either by usage or by available space. However, customers are not willing to pay for capacity provided by the host but not used. Rather, accurate charge-back is necessary, including power, which is becoming the largest line item cost for running a data center.

Computing the power consumed by a virtualized application enables computation of a monetary value relating power consumption to power generation and transmission. This monetary value then may be reported to a charge-back accounting system for assessment to the application owner. Moreover, this data may be provided directly to users, administrators, auditors, or other consumers of such data for presentation in reports or a real-time "dashboard" display.

Additionally, VMs may be migrated to physical machines where power, optionally including the associated carbon-emissions cost, is cheapest. Such "space-shifting" of VMs allows minimization of the total costs (power and otherwise) of running an application.

Example embodiments of the present invention enable extending these traditional charge-back mechanisms by measuring, managing and assigning the value of power consumed by an application in a virtual machine (VM). This method allocates power consumption to tenants based on data stored and data accessed. The rationale is that reading and writing data requires power consumption (e.g., for activating and potentially moving the arm of storage drives and overcoming preexisting magnetic field alignment) beyond that required to store and preserve the data at rest. Accordingly, in certain embodiments, the power consumption charged to a tenant may be the sum of the amount of power consumption attributable to the physical blocks backing the tenant's logical storage container plus the amount of power consumption attributable to accessing the tenant's logical storage container.

Example embodiments of the present invention determine the power metadata associated with storing data in a computer storage system, allocate the power consumption associated with storing data in a set of blocks, determine the power metadata associated with accessing (e.g., reading and writing) data in the computer storage system, and allocate the power consumption associated with accessing data in the set of blocks. Determining and allocating power consumption to the tenants using a set of blocks can be applied repeatedly. Thus, the power consumption attributed to a logical storage container at any level can be determined at successively lower levels until it is applied to the storage blocks of the underlying computer storage system.

It should be understood that example embodiments of the present invention apply equally to physical data centers and physical machines as well as to virtual data centers and virtual machines. Tenants may be in geographically dispersed locations, meaning that multiple companies, for example, could be running applications in physical or virtual machines all using storage provided by the same cloud storage provider.

Mapping Physical Storage to Logical Storage

FIG. 1 is a block diagram of a virtual data center 105 having three VMS (i.e., tenants) 120-1, 120-2, 120-3 (120, generally) hosting respective applications using logical storage (e.g., logical storage 1 130-1, logical storage 2 130-2, and logical storage 3 130-3) (130, generally). FIG. 1 also illustrates the physical storage (e.g., high capacity storage 150-1, high performance storage 150-2, and solid state storage 150-3) (150, generally) backing the logical storage 130. Further, a manager 145 may manage the logical storage 130 via a network 140. As will be described in greater detail below with reference to FIG. 2, the physical storage 150 may be mapped via multiple levels of logical mapping to one or more of the logical storage containers 130.

Figure 2:
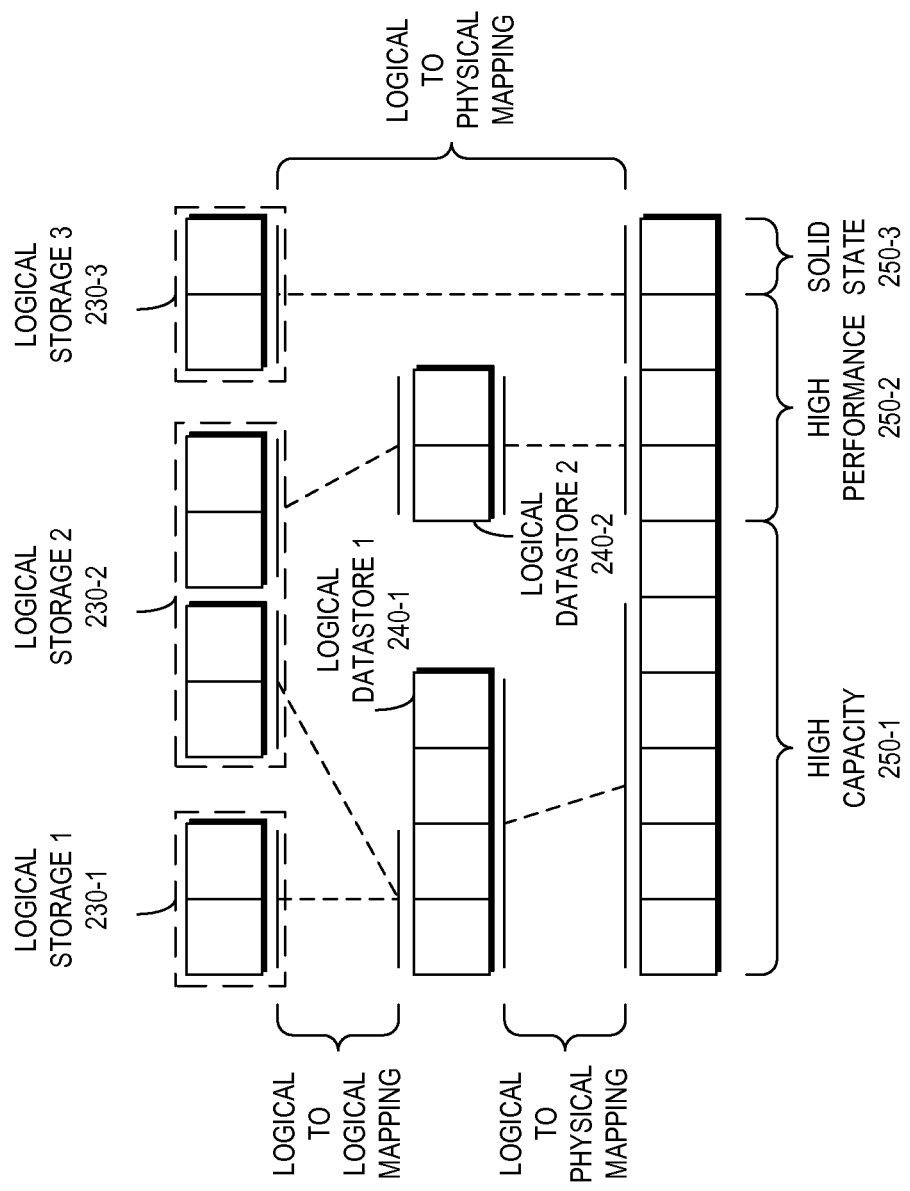
FIG. 2 is a block diagram illustrating the mapping of the physical storage of FIG. 1 to the tenants of the virtual data center.

FIG. 2 is a block diagram illustrating an example mapping of physical storage (e.g., high capacity storage 250-1, high performance storage 250-2, and solid state storage 250-3) (250, generally) to logical storage containers (e.g., logical storage 1 230-1, logical storage 2 230-2, and logical storage 3 230-3) (230, generally) for respective tenants (e.g., tenants 120 of FIG. 1) of the virtual data center (e.g., virtual data center 105 of FIG. 1).

As illustrated in FIG. 2, the physical storage 250 may be divided into sets of blocks (e.g., the high capacity storage 250-1 has six blocks, the high performance storage 250-2 has three blocks, and the solid state storage 250-3 has one block). A portion of each of each respective set of blocks may be provisioned (e.g., thick or thin provisioning) and mapped to the logical storage containers. Metadata regarding the network configuration or topology may include metadata regarding how logical units (LUNs) are configured (e.g., thin v. thick provisioning) and how much storage in thin provisioning is actually being used.

There may be multiple levels of logical mapping, including intermediate logical datastores 240-1, 240-2.

Thus, as illustrated in FIG. 2, five of the six blocks of physical high capacity storage 250-1 are logically mapped to four blocks of intermediate logical storage at logical datastore 1 240-1. Of the four logical blocks of intermediate logical datastore 1 240-1, two blocks of logical datastore 1 240-1 are shared via a second layer of logical mapping to two blocks of logical storage 1 230-1 for tenant 1 (e.g., tenant 1 120-1 of FIG. 1) and two blocks of logical storage 2 230-2 for tenant 2 (e.g., tenant 2 120-2 of FIG. 1).

Further, two of the three blocks of physical high performance storage 250-2 are logically mapped to two blocks of intermediate logical storage at logical datastore 2 240-2. The two logical blocks of intermediate logical datastore 2 240-2 are logically mapped together with the two blocks of logical datastore 1 240-1 referred to above to form the four blocks of logical storage 2 230-2 for tenant 2 (e.g., tenant 2 120-2 of FIG. 1).

Moreover, the remaining one of the three blocks of physical high performance storage 250-2 is logically mapped with the one block of physical solid state storage 250-3 to the two blocks of logical storage 3 230-3 for tenant 3 (e.g., tenant 3 120-3 of FIG. 1). Thus, multiple levels of logical mapping, and combinations of tiers of physical storage, may be used in mapping the physical storage 250 to the logical storage 230 for the tenants 120.

Determine the Power Metadata Associated with Storing Data in a Computer Storage System Power metadata for each managed block using measurements or modeled values may be determined during a "calibration period". Real-time power measurement also may be used via meters or other power measurement mechanisms, such as application programming interfaces (APIs), available for each storage block (e.g., power usage reporting capabilities are provided in various storage arrays).

The average power consumption of a computer storage system may be determined over a representative time period by measuring or modeling values for these categories:

- "Amortized-power" components must be powered on for the computer storage system to permanently retain stored data (e.g., controllers, system cache, power supplies);
- "Managed-power" components are directly associated with specific storage addresses (i.e., blocks) that are not typically powered off for extended periods of time during normal system operation (e.g., solid state devices and "spin-down" disk drives including massive array of idle disks (MAID)). This value should not reflect the power consumption of amortized-power components;
- "Episodic-power" components are directly associated with specific storage addresses that can be powered off for extended time periods when I/Os to those storage addresses are not required (e.g., archive storage including removable media). This value should not reflect the power consumption of amortized-power components. Note that, in a preferred embodiment, a component classified as a managed-power component cannot be an episodic-power component, and vice versa;

Power consumption for stored data may be by measured by determining the total power consumption of a storage system in a "ready idle" mode, in which the storage devices are powered up but there are no active I/Os being processed, and prorating the power consumption according to the number of blocks or the relative power consumption of each storage technology employed. First, the average power consumption of each storage technology used in the system may be determined over a representative time period by measuring or modeling values for the average power consumed by the components of each storage technology and the raw capacity provided by the components of each storage technology. Next, the average power consumption may be prorated over representative time periods across the storage capacity of the system, weighted by the total number of blocks for amortized-power components and weighted by the relative power consumption of each storage technology used for managedand episodic-power components. Each addressable block or set of blocks of "raw capacity" can be allocated a number of watts in this manner.

Consider these calibration values (measured or modeled) for a computer storage system. In this example, amortized power is prorated across 100 blocks equally, managed power is prorated across 10 solid state and 30 high performance blocks according to the relative power consumption of each technology, and episodic power is allocated across the 60 high capacity blocks:

| Amortized-power | 100W |
|---|---|
| Managed-power | 50W, Solid State and High Performance |
| Episodic-power | 20W, High Capacity |
| Solid State | 2W for 10 blocks |
| High Performance | 7W for 30 blocks |
| High Capacity | 1W for 60 blocks |

Power metadata for the blocks of the computer storage system is determined as follows:

| Amortized | 100W / (10 + 30 + 60) blocks | 1W per storage system block |
|---|---|---|
| Managed | 50W * (2W / (2W + 7W) / 10 blocks | 1.1W per solid state block |
| Managed | 50W * (7W / (2W + 7W) / 30 blocks | 1.3W per high performance block |
| Episodic | 20W * (1W / 1W) / 60 blocks | 0.3W per high capacity block |

The sum of amortized and either managed or episodic power (whichever applies) for a set of blocks is the power consumption allocated for storing data in those blocks. This value is referred to as the "store" power metadata for a set of blocks.

Allocate the Power Associated with Storing Data in a Set of Blocks

A logical storage container 230 is a set of logical blocks which a manager 145 provides to its tenants 120. The set of physical blocks 250 which the manager 145 uses to actually store the data are referred to as the underlying blocks. Managers 145 that provide enhanced protection (e.g., RAID) use more underlying blocks 250 than are presented to the tenant in the logical storage container 230. Managers 145 that provide capacity optimization (e.g., data deduplication, thin provisioning, delta snapshots) use fewer underlying blocks 250 than are presented to the tenant in the logical storage container 230.

The "store" power metadata is allocated according to the mapping between the blocks exposed to a tenant (i.e., a logical storage container 230) and the underlying physical blocks 250 backing the logical storage container 230. If N tenants share a set of underlying physical blocks 250, 1/N of the "store" power metadata for these blocks 250 will be attributed to each tenant. If a set of blocks is not allocated to any tenant, the power consumption of these blocks is attributed to the block manager 145 (the "landlord") as overhead. As will be illustrated below with reference to FIG. 6, "greedy landlords" may further assign overhead to their tenants 120, such as by prorating it according to the percent of power already attributed to each tenant 120. Similarly, if N>M blocks are used to back the M blocks presented to the tenant (e.g., to improve media protection), the power metadata of all of the N underlying blocks will be attributed to the tenant. In summary, the power metadata of the blocks backing the blocks of a logical storage container will be prorated according to the mapping maintained by each block manager for its tenants.

Determine the Power Metadata Associated with Accessing Data in a Computer Storage System Allocation of power consumption for accessed (i.e., read or written) data may be accomplished by determining the total power consumption of a storage system in "active" mode and prorating it over the blocks of that storage technology. Note that deleting data may consist of writing metadata blocks and optionally writing data blocks (e.g., secure erasure).

Accordingly, to determine the power metadata associated with accessing data, the average power consumption of a computer storage system performing I/O to a specific storage technology over a representative time period may be determined. Separate measurements for power and I/O operations per second (or modeled values) may be made for each storage technology employed.

For each storage technology, the average power consumed per I/O may be calculated. Each addressable block or set of blocks of "raw capacity" may be allocated a number of watts per I/O in this manner. This value is referred to as the "access" power metadata for blocks composed of a particular storage technology.

Consider these calibration values (e.g., measured or modeled) for accessing data in a computer storage system containing three storage technologies:

| Solid State | 2W for 100 reads and 5 writes |
|---|---|
| High Performance | 30W for 100 reads and 100 writes |
| High Capacity | 20W for 30 reads and 200 writes |

The "access" power metadata for the blocks within this computer storage system is determined as follows:

| Access (Solid State) | 2W / (100 + 5) I/Os | 0.019W per I/O |
|---|---|---|
| Access (High Performance) | 30W / (100 + 100) I/Os | 0.150W per I/O |
| Access (High Capacity) | 20W / (30 + 200) I/Os | 0.087W per I/O |

Allocate the Power Associated with Accessing Data in a Set of Blocks

The power consumption associated with accessing a logical storage container is attributed to the tenant owning the accessed logical storage container. It is calculated by multiplying the number of reads and writes (i.e., I/Os) within a logical storage container by the "access" power metadata associated with the accessed blocks. Whether the underlying blocks are shared by other tenants is not a factor in the allocation. It should be understood that storage arrays (e.g., physical and virtual) provide visibility into the number of reads and writes to a set of blocks and the identity of the tenant that owns the accessed blocks.

Using Metadata to Allocate Power Consumption to a Tenant

The power consumption attributed to a set of blocks is the summation of the power consumption of the blocks backing them, whether physical or logical. Power consumption associated with storing data in a set of blocks is prorated to the tenants sharing the underlying blocks. Power consumption associated with I/O activity is allocated to the tenant owning the accessed blocks. The deep (i.e., multiple levels) mapping between the logical storage container assigned to a tenant and the physical storage blocks backing this container is reflected in the repeated allocation of power associated with storing data in a set of blocks. Allocating power consumption is based upon power metadata which is determined during a representative "calibration" time period, as discussed above. Tenant allocations may be adjusted to equal the total power consumption measured over a time period by multiplying each allocation by the ratio of total measured power consumption to total allocated power consumption.

Figure 3:
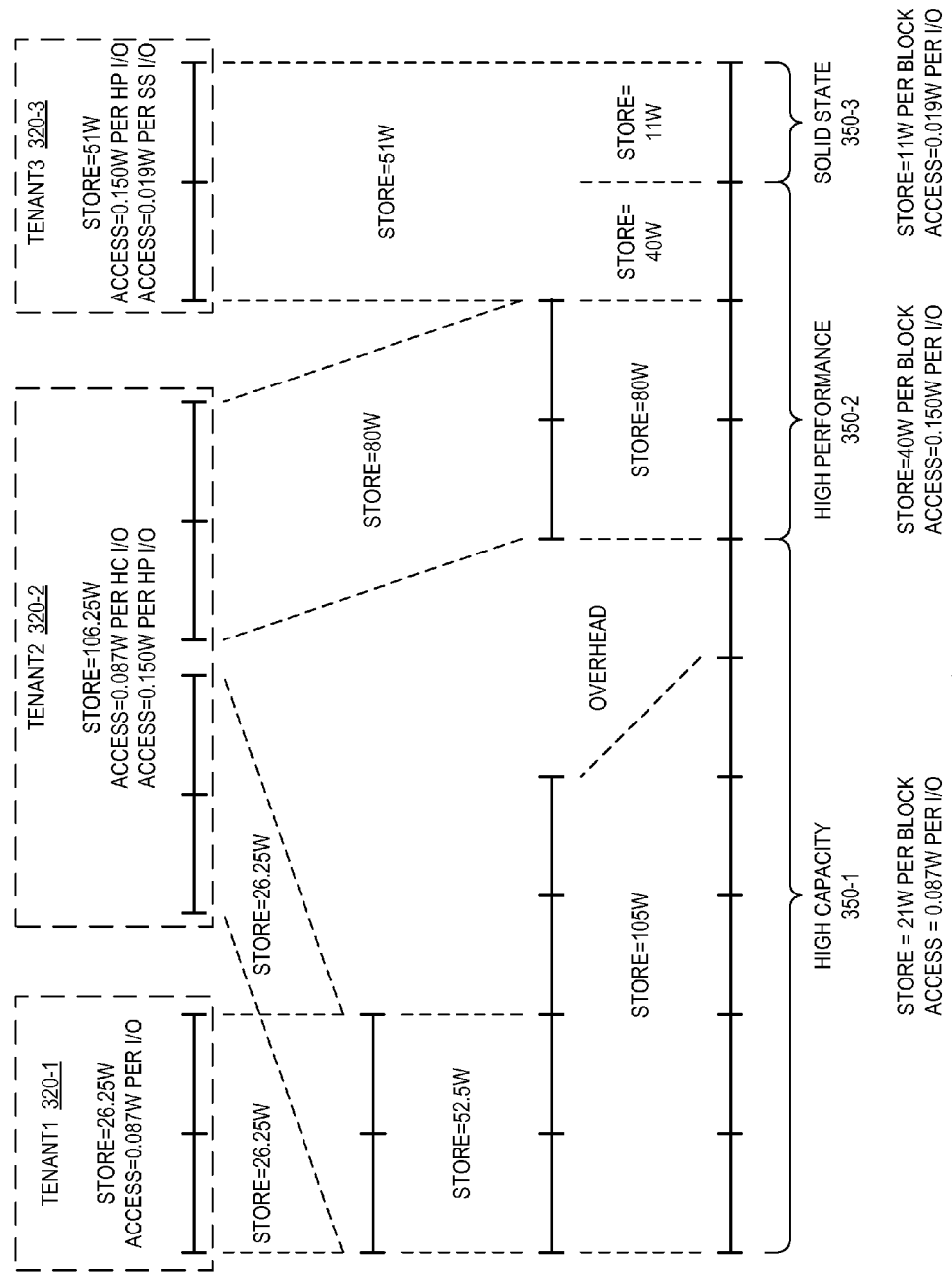
FIG. 3 is a block diagram illustrating the allocation of power consumption of a computer storage system to respective tenants.

FIG. 3 is a block diagram illustrating the allocation of power consumption of a computer storage system to respective tenants.

From the perspective of the physical storage blocks (e.g., physical storage 250 of FIG. 1) and the power metadata, the high capacity storage 350-1 having a store metadata value of 21 watts (W) per block and an access metadata value of 0.087 W per I/O. Further, the high performance storage 350-2 has a store metadata value of 40 W per block and an access metadata value of 0.150 W per I/O. Moreover, the solid state storage 350-3 has a store metadata value of 11 W per block and an access metadata value of 0.019 W per I/O.

For the high capacity storage 350-1, five of the six blocks are mapped to four blocks of intermediate logical storage (e.g., logical datastore 1 240-1 of FIG. 2). Thus, the store metadata value for logical datastore 1 240-1 is 105 W (5×21 W). The remaining sixth block of high capacity storage 350-1 is allocated to overhead.

Further, for the intermediate logical datastore 1 240-1, two of the four blocks are mapped to both the two blocks of logical storage 1 230-1 for tenant 1 320-1 and two of the four blocks of logical storage 2 230-2 for tenant 2 320-2. Thus, the store metadata value for logical storage 1 230-1 is 26.25 W (105 W/2/2). The remaining two blocks of intermediate logical datastore 1 240-1 are allocated to overhead.

For the high performance storage 350-2, two of the three blocks are mapped to intermediate logical storage (e.g., logical datastore 2 240-2 of FIG. 2). Thus, the store metadata value for logical datastore 2 240-2 is 80 W (2×40 W). The remaining third block of high performance storage 350-2 is mapped to the logical storage for the third tenant (e.g., logical storage 3 230-3 of FIG. 2).

Further, for the intermediate logical datastore 2 240-2, the two blocks are mapped to the remaining two of the four blocks of logical storage 2 230-2 for tenant 2 320-2. Moreover, as described above, two of the four blocks of intermediate logical datastore 1 240-1 are mapped to both the two blocks of logical storage 1 230-1 for tenant 1 320-1 and two of the four blocks of logical storage 2 230-2 for tenant 2 320-2. Thus, the store metadata value for logical storage 2 230-2 is 106.25 W (26.25 W+80 W).

For the solid state storage 350-3, the one block is also mapped to logical storage 3 230-3 with the third block of high performance storage 350-2 as described above. Thus, the store metadata value for logical datastore 3 240-3 is 51 W (40 W+11 W).

From the perspective of the tenants, tenant 1 320-1 has stored data allocated in two logical storage blocks (e.g., logical storage 1 230-1 of FIG. 2). These blocks are stored in, for example, a deduplicated container (i.e., logical datastore 1 240-1) that is sharing these blocks with tenant 2. Accordingly, with the blocks shared between tenant 1 and tenant 2, each of tenants 1 and 2 is allocated half the power consumption for storing two blocks of logical data 330-1 on high capacity storage 350-1 in the computer storage system (i.e., virtual data center 105).

Tenant 2 has stored data in a file system sharing blocks with tenant 1, as discussed above, and in a volume backed by two high performance disk blocks 350-2. As illustrated in FIG. 3, tenant 2 has accessed this file system 100 times. It also has accessed two blocks of a high performance storage 350-2 100 times (i.e., 100 I/Os). Tenant 2 is allocated half of the power for storing and accessing two blocks of logical data on physical high capacity disk 350-1 plus the power for storing and accessing two blocks of logical data on a high performance disk 350-2 in the computer storage system 105.

Tenant 3 has stored and accessed two blocks of logical data stored on a volume backed by one physical block stored on solid state device 350-3 and one physical block on high performance disk 350-2. Accordingly, tenant 3 is allocated the power for storing and accessing both blocks in their entirety.

It should be noted that one physical high capacity disk block 350-1 in the computer storage system is allocated to overhead. Further, a storage container (e.g., logical datastore 1 240-1) supporting thin provisioning allocates the blocks available for allocation, but not yet allocated blocks (i.e., two blocks of logical datastore 1 240-1) are allocated to overhead. As will be described below with reference to FIG. 6, power consumption for this overhead could be allocated to tenants that could use thin provisioning.

As will be described below with reference to the flow diagrams of FIGS. 4-5, metadata for the computer storage system may be used to allocate power consumption to a tenant.

FIG. 4 is a flow diagram illustrating an example method for determining power consumption of a computer storage system attributable to an application according to an example embodiment of the present invention. First the manager 145 may obtain metadata relating to power consumption of a computer storage system (405). For example, the manager 145 may obtain metadata relating to storage-level power consumption of a plurality of storage tiers of the computer storage system, such as amortized power metadata, managed power metadata, and episodic power metadata.

The manager 145 then may obtain metadata relating to storage configuration of the computer storage system (425). For example, the manager 145 may obtain metadata relating to a storage-level mapping configuration of the plurality of storage tiers of the computer storage system. Next, the manager 145 may determine storage utilization of the computer storage system attributable to an application (435). To determine the power consumption attributable to the application, the manager 145 may perform a transformation according to the metadata relating to power consumption of the computer storage system, the metadata relating to storage configuration of the computer storage system, and the storage utilization of the computer storage system attributable to the application (445).

FIG. 5 is a flow diagram illustrating an example method for determining power consumption of a computer storage system attributable to an application according to an example embodiment of the present invention. First, to obtain metadata relating to power consumption of a computer storage system (405), the manager 145 may obtain metadata relating to power consumption for storing data in the computer storage system and obtain metadata relating to power consumption for accessing data in the computer storage system. Accessing data in the computer storage system includes both reading data from and writing data to the computer storage system. Therefore, the manager 145 may obtain metadata relating to power consumption for reading data from the computer storage system (515) and obtain metadata relating to power consumption for writing data to the computer storage system (520).

Further, to obtain metadata relating to storage configuration of the computer storage system (425), the manager 145 may obtain metadata relating to a storage-level mapping configuration of the plurality of storage tiers of the computer storage system (530). Moreover, to determine storage utilization of the computer storage system attributable to an application (435), the manager 145 may determine storage utilization relating to storage blocks attributable to the application with respect to a storage-level mapping configuration of a plurality of storage tiers of the computer storage system (540). Finally, to determine the power consumption attributable to the application (445), the manager 145 may determine a respective share of power consumption of the computer storage system attributable to the application (550).

Figure 6:
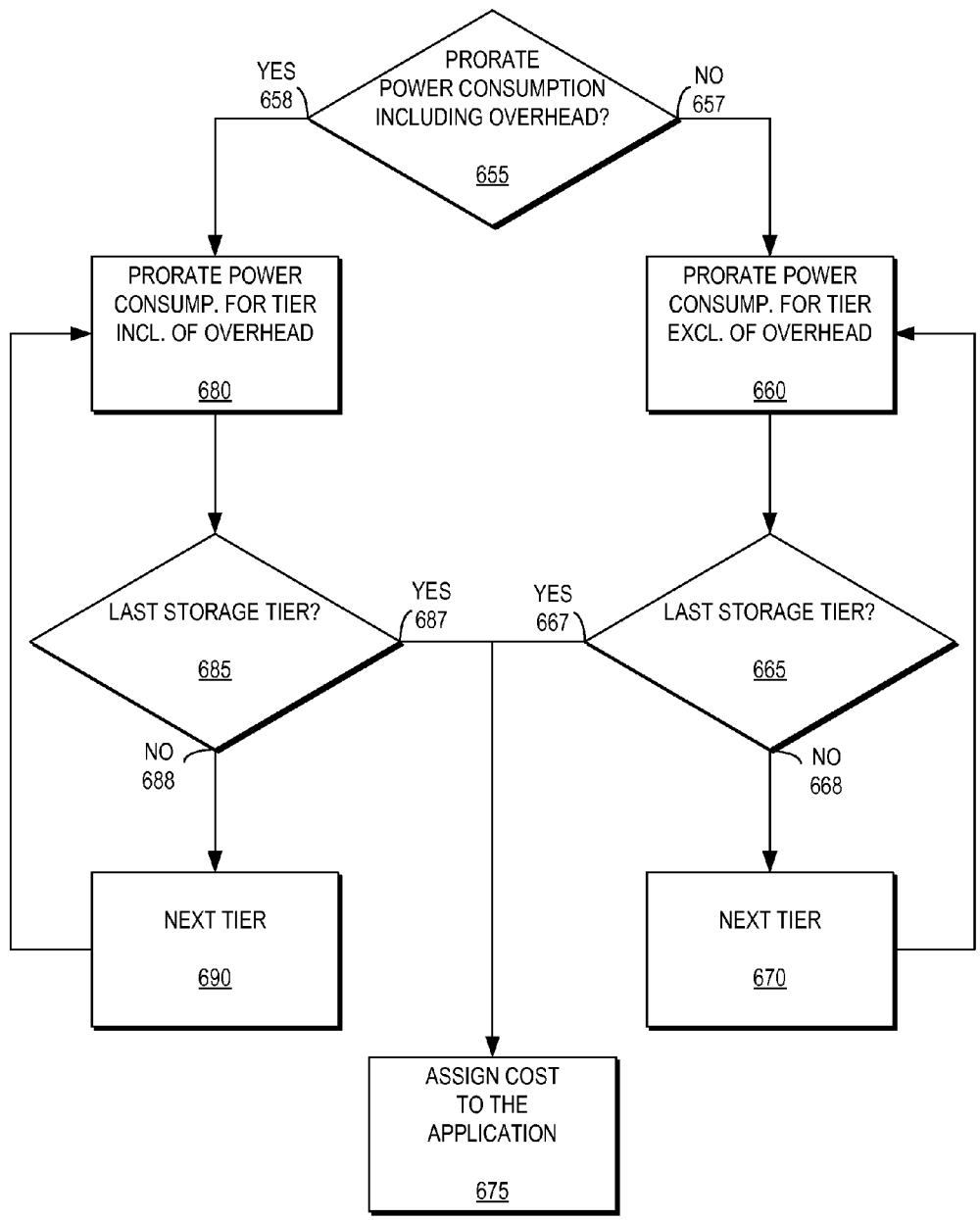
FIG. 6 is a flow diagram illustrating an example method for recursively prorating a share of power consumption within the storage tiers of a computer storage system.

FIG. 6 is a flow diagram illustrating an example method for recursively prorating a share of power consumption within the storage tiers of the computer storage system according to the metadata relating to storage configuration of the computer storage system. As illustrated in FIG. 6, the method includes determining whether the proration of the share of power consumption is exclusive (657) or inclusive (658) of overhead power consumption (655).

If the proration is exclusive (657) of overhead power consumption, the manager 145 prorates the share of power consumption within the storage tiers of the computer storage system exclusive of overhead power metadata (660). The manager then determines whether there are additional tiers of storage for recursively prorating a share of power consumption (i.e., is the current storage tier the last storage tier) (665). If it is the last storage tier (667), the manager has completed recursively prorating the share of power consumption and may assigning a cost to the application for the respective share of power consumption of the computer storage system attributable to the application (675). If it is not the last storage tier (668), the manager 145 moves to the next storage tier (670) and returns to continue recursively prorating the share of power consumption exclusive of overhead (660).

If the proration is inclusive (658) of overhead power consumption, the manager 145 prorates the share of power consumption within the storage tiers of the computer storage system inclusive of overhead power metadata (680). The manager then determines whether there are additional tiers of storage for recursively prorating a share of power consumption (i.e., is the current storage tier the last storage tier) (685). If it is the last storage tier (687), the manager has completed recursively prorating the share of power consumption and may assigning a cost to the application for the respective share of power consumption of the computer storage system attributable to the application (675). If it is not the last storage tier (688), the manager 145 moves to the next storage tier (690) and returns to continue recursively prorating the share of power consumption inclusive of overhead (680).

Figure 7:
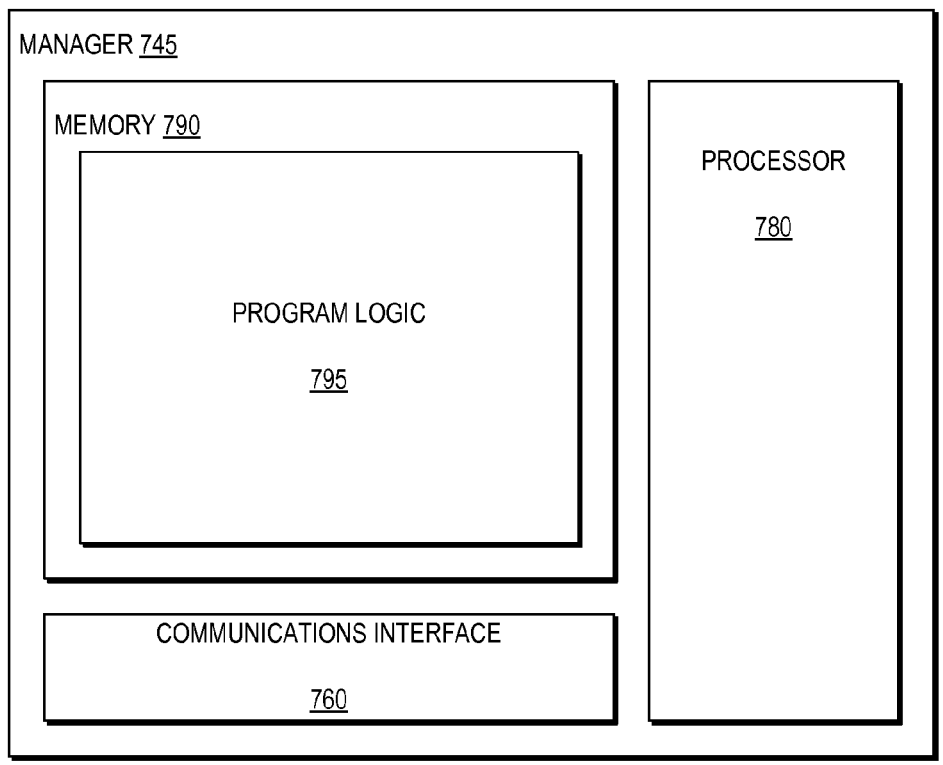
FIG. 7 is a block diagram of an example embodiment apparatus according to the present invention.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer 745 of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 8:
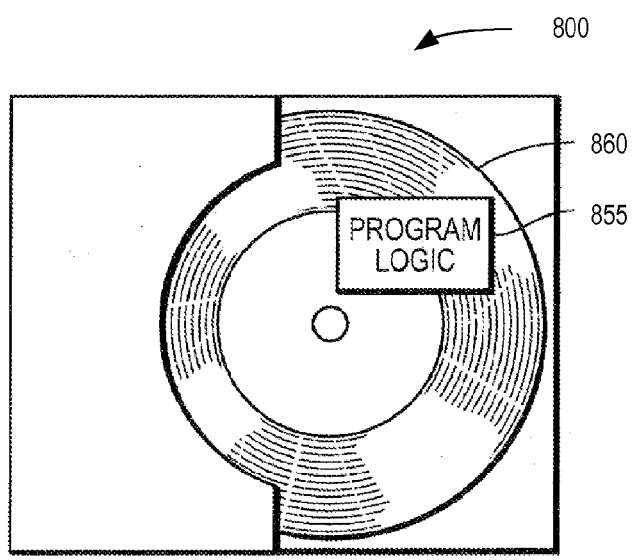
FIG. 8 is an illustration of an example embodiment of the present invention as embodied in program code.

FIG. 8 shows Program Logic 855 embodied on a computer-readable medium 860 as shown, and wherein the Logic is encoded in computer-executable code configured for carrying out the reservation service process of this invention and thereby forming a Computer Program Product 800.

The logic for carrying out the method may be embodied as part of the aforementioned system, which is useful for carrying out a method described with reference to embodiments shown in, for example, FIGS. 1-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
obtaining metadata relating to storage-level power consumption of a plurality of storage tiers of a computer storage system;
obtaining metadata relating to a storage-level mapping configuration of the plurality of storage tiers of the computer storage system describing a mapping of logical storage for an application to physical storage in the computer storage system;
determining storage utilization relating to storage blocks attributable to an application with respect to the storage-level mapping configuration of the plurality of storage tiers of the computer storage system; and
performing a transformation according to the metadata relating to power consumption of the computer storage system, the metadata relating to storage configuration of the computer storage system, and the storage utilization of the computer storage system attributable to the application to determine power consumption of the computer storage system attributable to the application.

2. The method of claim 1 wherein obtaining metadata relating to power consumption of a computer storage system comprises:
obtaining metadata relating to power consumption for storing data in the computer storage system; and
obtaining metadata relating to power consumption for accessing data in the computer storage system.

3. The method of claim 2 wherein obtaining metadata relating to power consumption for accessing data in the computer storage system comprises:
obtaining metadata relating to power consumption for reading data from the computer storage system; and
obtaining metadata relating to power consumption for writing data to the computer storage system.

4. The method of claim 1 wherein obtaining metadata relating to power consumption of a computer storage system comprises:
obtaining amortized power metadata,
obtaining managed power metadata; and
obtaining episodic power metadata.

5. The method of claim 1 wherein performing a transformation according to the metadata relating to power consumption of the computer storage system, the metadata relating to storage configuration of the computer storage system, and the storage utilization of the computer storage system attributable to the application to determine the respective share of power consumption of the computer storage system attributable to the application comprises determining a respective share of power consumption of the computer storage system attributable to the application.

6. The method of claim 5 further comprising assigning a cost to the application for the respective share of power consumption of the computer storage system attributable to the application.

7. The method of claim 6 wherein assigning a cost to the application for the respective share of power consumption of the computer storage system attributable to the application comprises recursively prorating the share of power consumption within the storage tiers of the computer storage system according to the metadata relating to storage configuration of the computer storage system.

8. The method of claim 7 wherein recursively prorating the share of power consumption within the storage tiers of the computer storage system according to the metadata relating to storage configuration of the computer storage system comprises prorating the share of power consumption within the storage tiers of the computer storage system inclusive of overhead power metadata.

9. The method of claim 7 wherein recursively prorating the share of power consumption within the storage tiers of the computer storage system according to the metadata relating to storage configuration of the computer storage system comprises prorating the share of power consumption within the storage tiers of the computer storage system exclusive of overhead power metadata.

10. An apparatus for determining a share of power consumption by an application executing on a server, the apparatus comprising:
   a processor;
   a communications interface; and
   memory encoded with a power consumption determination application that, when executed by the processor, causes the processor to perform the operations of:
      obtaining metadata relating to storage-level power consumption of a plurality of storage tiers of a computer storage system;
      obtaining metadata relating to a storage-level mapping configuration of the plurality of storage tiers the computer storage system describing a mapping of logical storage for an application to physical storage in the computer storage system;
      determining storage utilization relating to storage blocks attributable to an application with respect to the storage-level mapping configuration of the plurality of storage tiers of the computer storage system; and
      performing a transformation according to the metadata relating to power consumption of the computer storage system, the metadata relating to storage configuration of the computer storage system, and the storage utilization of the computer storage system attributable to the application to determine power consumption of the computer storage system attributable to the application.

11. The apparatus of claim 10 wherein obtaining metadata relating to power consumption of a computer storage system comprises:
   obtaining metadata relating to power consumption for storing data in the computer storage system; and
   obtaining metadata relating to power consumption for accessing data in the computer storage system.

12. The apparatus of claim 11 wherein obtaining metadata relating to power consumption for accessing data in the computer storage system comprises:
   obtaining metadata relating to power consumption for reading data from the computer storage system; and
   obtaining metadata relating to power consumption for writing data to the computer storage system.

13. The apparatus of claim 10 wherein obtaining metadata relating to power consumption of a computer storage system comprises:
   obtaining amortized power metadata,
   obtaining managed power metadata; and
   obtaining episodic power metadata.

14. The apparatus of claim 10 wherein performing a transformation according to the metadata relating to power consumption of the computer storage system, the metadata relating to storage configuration of the computer storage system, and the storage utilization of the computer storage system attributable to the application to determine the respective share of power consumption of the computer storage system attributable to the application comprises determining a respective share of power consumption of the computer storage system attributable to the application.

15. The apparatus of claim 14 further comprising assigning a cost to the application for the respective share of power consumption of the computer storage system attributable to the application.

16. The apparatus of claim 15 wherein assigning a cost to the application for the respective share of power consumption of the computer storage system attributable to the application comprises recursively prorating the share of power consumption within the storage tiers of the computer storage system according to the metadata relating to storage configuration of the computer storage system.

17. The apparatus of claim 16 wherein recursively prorating the share of power consumption within the storage tiers of the computer storage system according to the metadata relating to storage configuration of the computer storage system comprises prorating the share of power consumption within the storage tiers of the computer storage system inclusive of overhead power metadata.

18. The apparatus of claim 16 wherein recursively prorating the share of power consumption within the storage tiers of the computer storage system according to the metadata relating to storage configuration of the computer storage system comprises prorating the share of power consumption within the storage tiers of the computer storage system exclusive of overhead power metadata.

19. A computer program product having a non-transitory computer readable storage medium with instructions encoded thereon that, when executed by a processor of a computer, causes the computer to perform the operations of:
   obtaining metadata relating to storage-level power consumption of a plurality of storage tiers of a computer storage system;
   obtaining metadata relating to a storage-level mapping configuration of the plurality of storage tiers of the computer storage system describing a mapping of logical storage for an application to physical storage in the computer storage system;
   determining storage utilization relating to storage blocks attributable to an application with respect to the storage-level mapping confirmation of the plurality of storage tiers of the computer storage system; and performing a transformation according to the metadata relating to power consumption of the computer storage system, the metadata relating to storage configuration of the computer storage system, and the storage utilization of the computer storage system attributable to the application to determine power consumption of the computer storage system attributable to the application.

* * * * *